US009847914B2

(12) United States Patent
Ashwood-Smith

(10) Patent No.: US 9,847,914 B2
(45) Date of Patent: Dec. 19, 2017

(54) METHOD AND SYSTEM FOR SITE INTERCONNECTION OVER A TRANSPORT NETWORK

(71) Applicant: Peter Ashwood-Smith, Gatineau (CA)

(72) Inventor: Peter Ashwood-Smith, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 14/943,709

(22) Filed: Nov. 17, 2015

(65) Prior Publication Data

US 2017/0012827 A1 Jan. 12, 2017

Related U.S. Application Data

(60) Provisional application No. 62/191,011, filed on Jul. 10, 2015.

(51) Int. Cl.
*H04L 12/24* (2006.01)

(52) U.S. Cl.
CPC .......... *H04L 41/12* (2013.01); *H04L 41/0823* (2013.01); *H04L 41/0896* (2013.01)

(58) Field of Classification Search
CPC ............................ H04L 41/12; H04L 41/0823
See application file for complete search history.

(56) References Cited

U.S. PATENT DOCUMENTS

2007/0162750 A1* 7/2007 Konig .................. H04L 9/0833 713/168
2013/0108264 A1* 5/2013 deRuijter ............ H04Q 3/0083 398/45
2014/0122683 A1 5/2014 Zhao et al.
2014/0207923 A1 7/2014 Jokinen et al.
2015/0002616 A1 1/2015 Yoon et al.
2015/0271255 A1* 9/2015 Mackay ................ H04L 67/101 709/226
2016/0330075 A1* 11/2016 Tiwari ................ H04L 41/0806

FOREIGN PATENT DOCUMENTS

CN 104052665 9/2014

* cited by examiner

*Primary Examiner* — Mohammad Anwar

(57) ABSTRACT

Methods and systems for managing traffic among a plurality of interconnected sites. The sites are interconnected via ring members and ring segments of a logical ring implemented by a network controller over a physical transport network. When it is determined there is a change in traffic that requires a change in ring topology, topology optimization is performed to accommodate the change in traffic. The topology optimization may include: dynamically increasing capacity of a ring segment, dynamically decreasing capacity of a ring segment, dynamically creating a traffic path, and/or dynamically removing a traffic path.

19 Claims, 12 Drawing Sheets

310
305
205
305a
110
113
210
310a
105
305b

METHOD AND SYSTEM FOR SITE INTERCONNECTION OVER A TRANSPORT NETWORK

CROSS-REFERENCE TO RELATED APPLICATIONS

The present disclosure claims priority from U.S. provisional patent application No. 62/191,011, filed Jul. 10, 2015, the entirety of which is hereby incorporated by reference.

FIELD

The present disclosure relates, generally, to transport networks, and more specifically, to use of transport software-defined networking to interconnect sites over a transport network.

BACKGROUND

Transport software-defined networking (TSDN) may be considered to apply to the application of software-defined networking (SDN) techniques to the transport layers of a service provider Wide Area Network (WAN). The transport layers include layer 0 (L0) and layer 1 (L1), and possibly layer 2 (L2) in some cases. In the seven-layer Open Systems Interconnection (OSI) model of computer networking, the physical layer is L1 . The network cabling is sometimes referred to as L0. L0 may use, for example, Dense Wavelength Division Multiplexing (DWDM) or photonic transport systems. L1 may, for example, employ protocols such as Synchronous Optical Networking (SONET), Synchronous Digital Hierarchy (SDH) and Optical Transport Network (OTN). Layer 2 may be Ethernet.

A TSDN controller may monitor and manage traffic flows in the network.

SUMMARY

In some examples, the present disclosure describes a method of managing traffic among a plurality of interconnected sites, the sites being interconnected via ring members and ring segments of a logical ring implemented by a network controller over a physical transport network. The method includes: receiving information about traffic in the logical ring; determining, in accordance with the received information, a need for a change in ring topology; in response to the determining, performing topology optimization to accommodate the change in traffic, the topology optimization including at least one of: increasing capacity of a ring segment, decreasing capacity of a ring segment, creating a traffic path, and removing a traffic path; and transmitting updated routing information to ring members, the routing information reflecting the change in ring topology.

In some examples, the present disclosure describes a system for managing traffic among a plurality of interconnected sites. The system includes: a transport software-defined networking (TSDN) controller configured to manage traffic over a transport network including the sites, the TSDN controller comprising a processor configured to execute instructions to cause the TSDN controller to: implement a logical ring over physical components of the transport network, the logical ring including ring members and ring segments, the sites being logically interconnected via the logical ring; receive information about traffic in the logical ring; determine, in accordance with the received information, a need for a change in ring topology; in response to the determining, perform topology optimization to accommodate the change in traffic, the topology optimization including at least one of: increasing capacity of a ring segment, decreasing capacity of a ring segment, creating a traffic path, and removing a traffic path; and transmit updated routing information to ring members, the routing information reflecting the change in ring topology.

In some examples, the present disclosure describes a network including: a plurality of sites; a plurality of optical switches interconnecting the plurality of sites via physical links; and a transport software-defined networking (TSDN) controller managing the plurality of optical switches; the TSDN controller being configured to implement a logical ring over the optical switches and the physical links, the logical ring including ring members and ring segments not necessarily coincident with the optical switches and the physical links, the sites being logically interconnected via the logical ring.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

Figure 1:
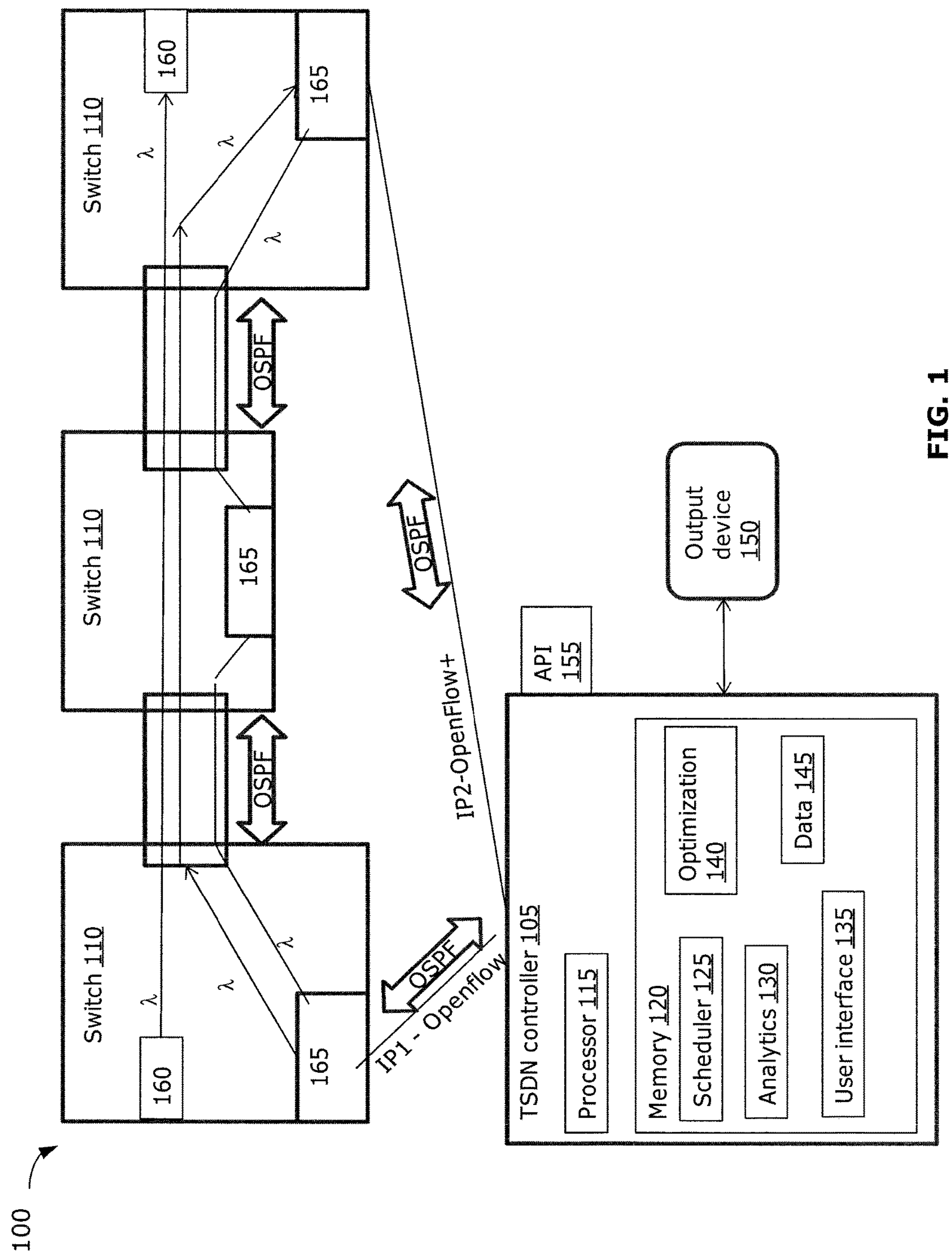
FIG. 1 is a schematic diagram illustrating a simplified example of a physical network for TSDN.

FIG. 1 is a schematic diagram illustrating a simplified example physical transport network 100 for TSDN. In this example, a TSDN controller 105 monitors and manages connections among three switches 110. In some examples, there may be a plurality of TSDN controllers 105 working together. Although three switches 110 are shown, it should be understood that the network 100 may be much more complex with many more switches 110.

The TSDN controller 105 may include one or more processors 115 coupled to one or more memories 120. The processor(s) 115 may access data in the internal memory (ies) 120 and/or one or more external memories (not shown), and may execute instructions stored in the internal memory (ies) 120 and/or external memory(ies). For example, the memory(ies) 120 may include instructions that when executed cause the TSDN controller 105 to implement a scheduler function 125, an analytics function 130, a user interface function 135 and a network optimization function 140. The scheduler function 125 may serve to perform path scheduling among the switches 110. This may enable very precise time-synchronized path addition/removal, for near-hitless network movements. The analytics function 130 may serve to perform statistical analysis on path traffic. For example, the analytics function 130 may monitor the network 100 for any changes or development of problems, and may provide early warning of expected network problems. The user interface function 135 may serve to provide a graphical output to a user. The network optimization function 140 may serve to perform path optimizations (e.g., on the basis of results from the analytics function 130). The instructions to carry out such functions 125, 130, 135, 140 may be provided by respective software modules or applications executed by the processor(s) 115, may be provided by a single software module or application, may be provided by combinations of multiple software modules or applications, or may be provided simply as coded instructions in an operating system, for example. In some examples, one or more of the functions 125, 130, 135, 140 may be encoded in instructions stored external to the TSDN controller 105 (e.g., in a remotely accessed memory (not shown)), and may be accessed by the TSDN controller 105 to carry out the appropriate function. The memory(ies) 120 may further store data 145, such as data relevant to managing the transport network. In some examples, one or more portions of data 145 may be stored externally and accessed by the TSDN controller 105 as required. The TSDN controller 105 may also store in its memory(ies) 120 (or external memory (ies)) a record of all network events, and may enable playback or review of network events off-line.

The processor(s) 115 may be coupled to an output device 150 (e.g., a computer monitor) internal or external to the TSDN controller 105, to provide output to a user via the user interface function 135, for example. The user interface function 135 may enable output of a graphical user interface (e.g., a high quality 3D graphics display) displaying a graphical representation of the managed network (e.g., representation of the physical links and/or logical links of the network), for example using a simple user interface. This may be a user extensible user interface, with embedded programming. The TSDN controller 105 may also include one or more application program interfaces (APIs) 155, to enable the TSDN controller 105 to interface with one or more external systems (not shown). For example, an API 155 may enable a third-party application to schedule connections, check network status or add/remove paths, among other tasks.

The TSDN controller 105 may include one or more redundant or shadow controllers, for example for the purpose of migration debugging.

A switch 110 may be an optical switch (also referred to as a lambda switch) that enables the switching of different wavelengths of light (also referred to as lambdas). A switch 110 may include an optical port 160 and/or an electrical port 165 (e.g., an electrical layer 2 (L2)/layer 3 (L3) port). Paths may terminate at an optical port 160 or an electrical port 165. Electrical port 165 receives data from external nodes over an electrical interface and can encode the received data flows for transmission as optical signals.

Connections between the TSDN controller 105 and between switches 110 may be using any suitable protocol, including Open Shortest Path First (OSPF) and other protocols that will be apparent to those skilled in the art. The switches 110 may have simple Internet Protocol version 6 (IPv6) connectivity, such as using zero configuration v6 (e.g., using addresses assigned during manufacturing). The switches may run Generalized Multi-Protocol Label Switching (GMPLS) extensions to OSPF for constraint advertising. The advertised constraints may be stored as data 145 in the TSDN controller 105. One skilled in the art will appreciate that switch 110 could also use other protocols for connectivity, including but not limited to IPv4.

The TSDN controller 105 may have dual redundant connections and may run OSPF for graph learning. The TSDN controller 105 may use OpenFlow over IP to communicate with switch 110. Indirect IP connectivity via OSPF v6 for data center network (DCN) may be reserved for low speed optical paths. The TSDN controller 105 may include a field-programmable gate array (FPGA) for performing high speed path optimizations (e.g., using linear programming (LP) solvers and convex optimizations) in the network optimization function 140. The TSDN controller 105 may implement time-based path scheduling using the scheduler function 125. The TSDN controller 105 may also perform service level agreement (SLA) monitoring for each path, and on the basis of such monitoring may carry out optical mesh network protection, for example by triggering creation of a new path for dedicated backup path protection (DBPP or 1+1 protection).

L2/L3 virtual forwarding instance (VFI) or virtual routing and forwarding (VRF) function may be populated with forwarding state by the TSDN controller 105. For example, a network processing unit (NPU) or application-specific integrated circuit (ASIC) may be placed at electrical terminations for L2 VPNs or layer 3 VPNs. The paths in the network 100 may be variable-sized, for example flexible grids down to 10G each may be used.

Figure 2A:
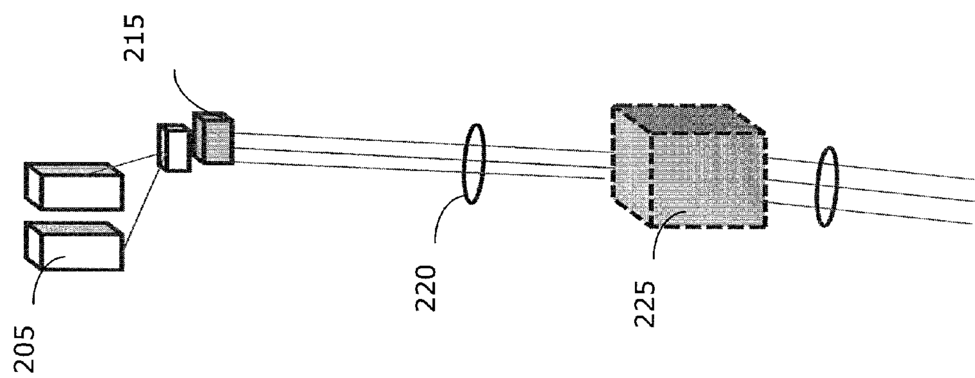
FIGS. 2A and 2B are a schematic diagrams illustrating an example logical model for managing site interconnection over a transport network.
Figure 2B:
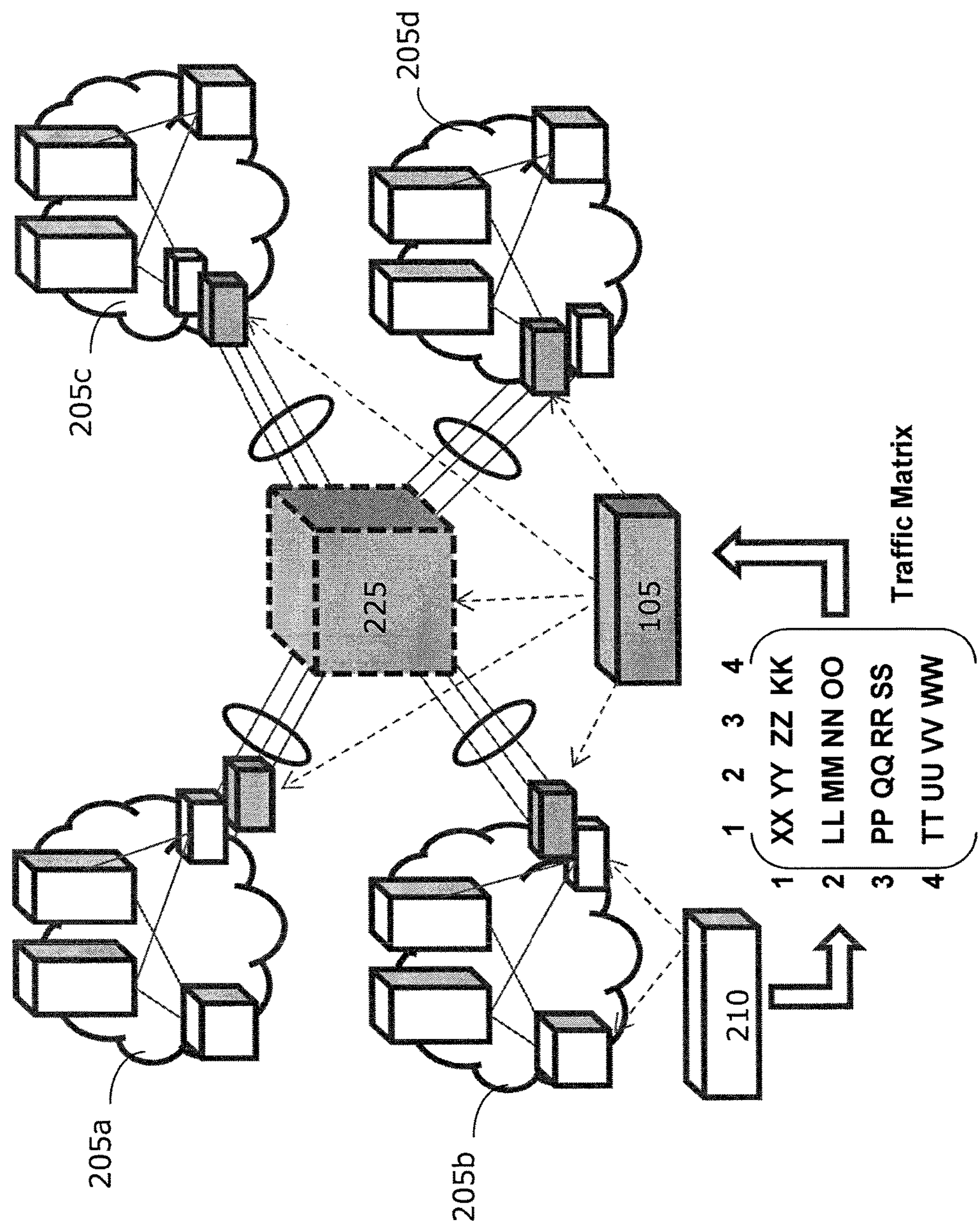

FIGS. 2A and 2B are schematic diagrams illustrating an example logical model for managing site interconnection over an example transport network. FIGS. 2A and 2B may be logical representations that may be implemented using the physical network connections described with respect to FIG. 1.

In this example, a logical transport may be used to interconnect multiple sites 205*a*, 205*b*, 205*c*, 205*d* (collectively referred to as sites 205), for example data centers. Turning to FIG. 2A, a site 205 may be a high capacity site, and may be implemented using relatively inexpensive L2 switch fabric and relatively inexpensive short-reach optical components, for example. A site controller 210 (see FIG. 2B) may be used to manage the local site network. The site 205 may connect to a transport device 215, such as an L2 switch, which may provide longer-reach optical components (e.g., implementing DWDM). Link aggregation (LAG) may be used to aggregate links from the transport device 215 to the transport network creating a single logical link, which may be referred to as a LAG link 220. In this example logical model, the transport network may appear to be a single central logical L2 switch 225 from the perspective of site 205. The single central switch 225 may be conceptualized as a high capacity switch that enables packet switching from any incoming LAG link 220 to any outgoing LAG link 220.

As illustrated by FIG. 2B, for example, the result of creating a conceptual central switch 225 is that each of the sites 205*a*, 205*b*, 205*c*, 205*d*, view the network as having a star-like configuration, so that each site 205 needs to only transmit data to the central switch 225 for routing. This is in contrast to a physical configuration in which there are a plurality of actual node-to-node connections of the transport network connecting each site 205 to each other site 205. The site controller 210 may only need to transmit traffic information (e.g., in the form of a traffic matrix) to the TSDN controller 105, without having to know the traffic along actual network paths. Although the site controller 210 is illustrated only for one site 205*b*, it should be understood that there may be a site controller 210 for each site 205*a*, 205*b*, 205*c*, 205*d*, to communicate the traffic information pertinent to each site 205*a*, 205*b*, 205*c*, 205*d* to the TSDN controller 105.

In various examples, the present disclosure describes an arrangement for a transport network that provides logical L2 interconnections between sites. LAG links may be used to connect each site to the transport network. The TSDN controller may implement a logical L2 switch via a logical ring, which is virtualized over the physical network. This may provide resilient L2 unicast and multicast between ring members. Further, the TSDN controller may dynamically modify the logical ring, for example by dynamically increasing/decreasing capacity of ring segments, by dynamically adding/removing ring members and ring segments, and by dynamically creating ring bypass segments (also referred to as cut-throughs) of various capacity for the purpose of unicast traffic, for example. The use of LAG links may enable hitless or near-hitless increases/decreases in ring capacity, resulting in flexible network bandwidth.

The site controller may only need to communicate a desired traffic matrix to the TSDN controller (e.g., via an API provided by the TSDN controller). The TSDN controller may (e.g., using its scheduler, analytics and optimization functions) dynamically adjust the bandwidth of different links to satisfy the desired traffic matrix. The TSDN controller may create/remove ring bypass segments dynamically in response to changing traffic matrices from the sites, for example.

In various examples, the present disclosure may enable reduction of operational costs by automating the creation of logical links between sites and dynamically controlling the capacity of the logical links, with little or no control impacts on the sites themselves. Use of the L2 datapath may enable implementation of any suitable L2 solution, for example Ethernet/IPv4/IPv6 with OSPF/Intermediate System-to-Intermediate System (ISIS)/Border Gateway Protocol (BGP) may be used over top of the transparent network. Standard Ethernet ring technology may thus be used to implement basic L2 connectivity. A site may use address resolution protocol (ARP) to form a subnet and may then run IP and a virtual extensible local area network (VXLAN), for example.

Figure 3:
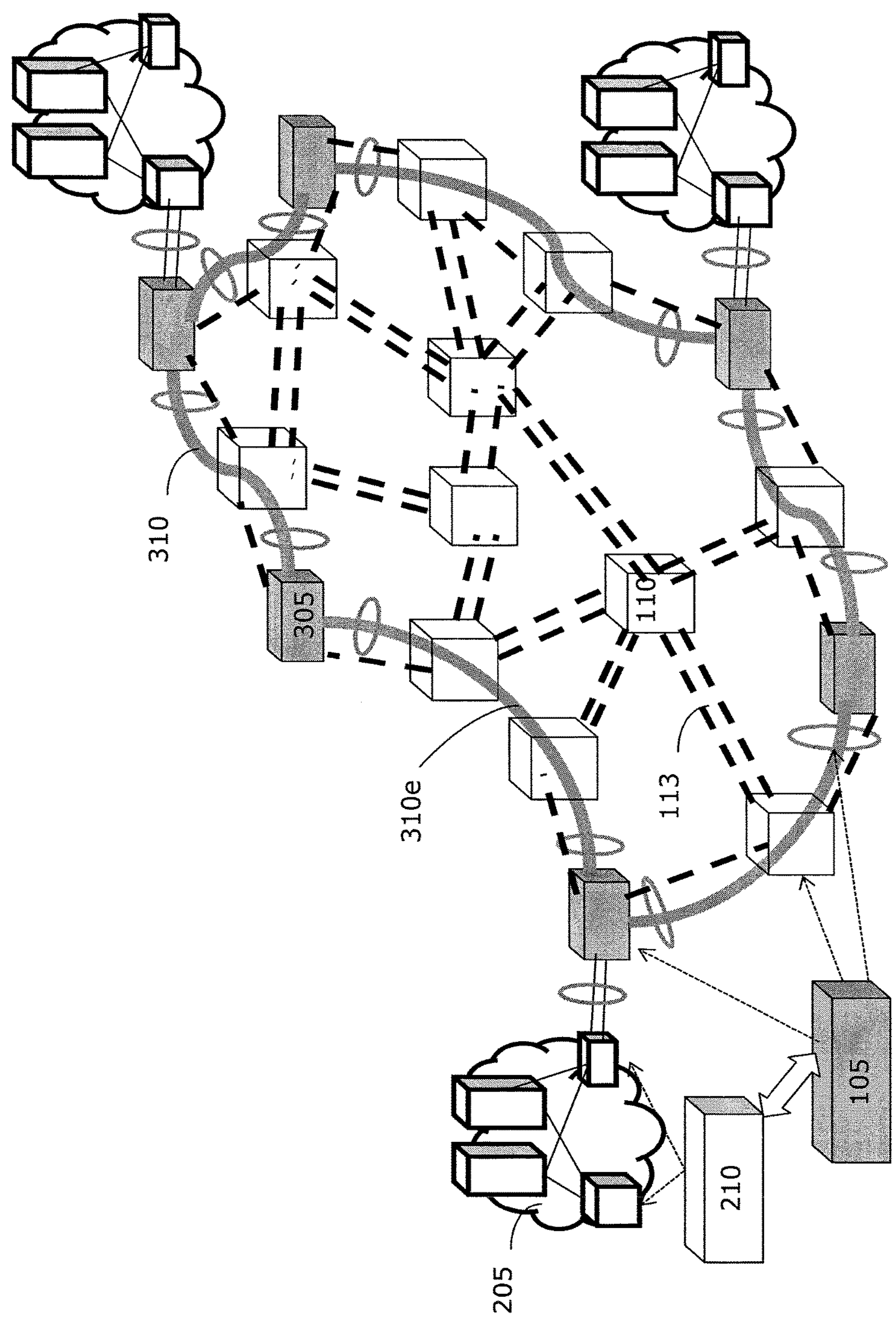
FIG. 3 is a schematic diagram illustrating an example logical ring that may be implemented by a TSDN controller to interconnect sites over a transport network.

FIG. 3 is a schematic diagram illustrating an example logical ring that may be implemented by a TSDN controller to interconnect sites over the transport network. As explained above, by implementing such a logical ring, the logical model of a central switch may be achieved.

The logical ring may be a virtual topology on top of the physical network. In the example shown, the physical network may include physical switches 110 (e.g., L1/L0 switches) interconnected by optical fibers 113. The TSDN controller 105 may manage data paths in the physical network in order to achieve the logical ring.

The TSDN controller 105 may create the logical ring (e.g., over Ethernet) using L1/L0 segments that interconnect a set of sites. Any suitable L2 ring protocol may be used (e.g., Resilient Packet Ring (RPR) G.8032). In some examples, as described further below, multiple sets of sites may be interconnected using the same logical ring.

The logical ring may include multiple ring members 305 connected via ring segments 310. Each ring member 305 may be a passive optical switch that provides an L2 input and an L1/L0 output (e.g., Ethernet input, to optical transport network (OTN), then to DWDM output). Each ring segment 310 may include L1/L0 logical connections aggregated together (e.g., via LAG) to create a logical L2 path or L2 pipe. Some ring members 305 may connect to a site 205 (e.g., via a LAG link), while other ring members 305 may simply serve to pass traffic through without connection to a site 205. Although FIG. 3 shows no more than one site 205 connected to a ring member 305, in other example embodiments a ring member 305 may be connected to two or more sites 205. Packets may be labeled for specific sites 205 and may be added to or pulled off the logical ring by each site 205, as appropriate.

A ring segment 310 represents a logical path between two ring members 305. Although logically represented as a direct path between ring members 305, a ring segment 310 may be physically implemented via multiple fiber 113 interconnections among multiple physical switches 110. Although some ring segments 310 in FIG. 3 are shown approximately coinciding with physical fibers 113, the ring segments 310 are logical paths that do not necessarily coincide with the physical paths of the network, for example as can be seen in ring segment 310*e*.

It should be noted that the sites 205 may be unaware of the existence of the logical ring. From the viewpoint of a site 205, it may simply appear that its traffic is being handled through a central switch.

As will be described below, the TSDN controller may dynamically adjust the logical ring, for example to adjust to changing traffic demands.

Figure 4:
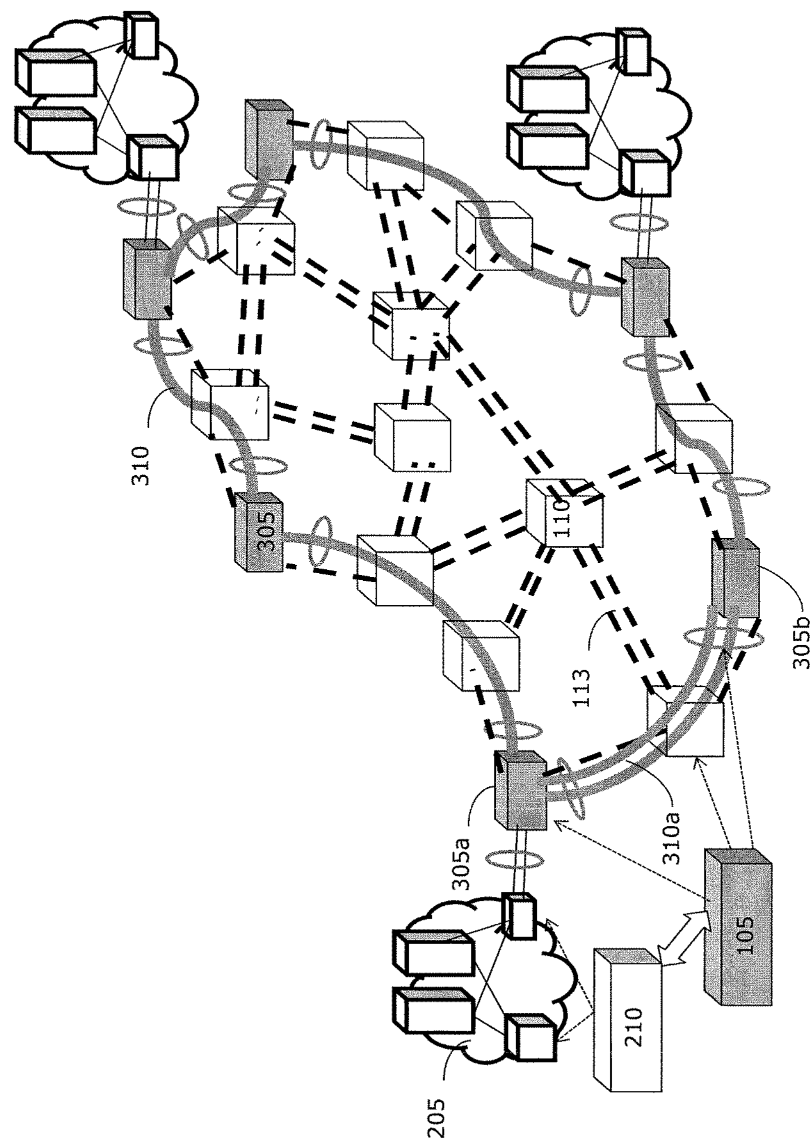
FIG. 4 is a schematic diagram illustrating an example of how a TSDN controller may dynamically resize capacity of a segment of an example logical ring.

FIG. 4 is a schematic diagram illustrating an example of how the TSDN controller 105 may dynamically resize capacity of a ring segment 310.

The TSDN controller 105 may receive traffic demands (e.g., in the form of a traffic matrix) from a site controller 210. The received traffic demands may indicate that a resizing of the capacity of a ring segment 310 ie required or desired (e.g., as determined using the analytics and optimization functions of the TSDN controller 105). In the example shown, an increase in the bandwidth between ring members 305*a* and 305*b* may be required, in response to increased traffic, as may be determined by analysis of a traffic matrix received from the site controller 210. The TSDN controller 105 may increase the bandwidth of the ring segment 310*a* between the ring members 305*a* and 305*b* by adding parallel L1/L0 connections to the LAG link of the ring segment 310*a*. Such parallel connections may be added without affecting other ring segments 310 provided there is unused bandwidth available to the TSDN controller 105. In cases where there is no unused bandwidth available, the TSDN controller 105 may determine (e.g., using appropriate optimization algorithms) how to redistribute bandwidth among the ring segments 310 in order to satisfy the need for increased bandwidth on the ring segment 310*a* between the ring members 305*a* and 305*b*. For example, this may involve reducing the bandwidth on one or more other ring segments 310. Similarly, the traffic demands may indicate that a decrease in the bandwidth of a ring segment 310 is appropriate. The TSDN controller 105 may accordingly remove parallel L1/L0 connections from the LAG link of the ring segment 310, in order to free up bandwidth. In some cases, even if traffic demands indicate that a decrease in capacity is appropriate, the TSDN controller 105 may not immediately remove connections from the LAG link (e.g., the TSDN controller 105 may implement a hysteresis effect), for example in anticipation of future needs and/or to avoid flip-flopping. It should be noted that the TSDN controller 105 may also manage connectivity between sites 205 that are not a part of the ring network, and the TSDN controller's determination of whether to increase or decrease bandwidth on a ring segment 310 may be made with consideration of the requirements of other network connectivity issues other than those of the ring network.

Figure 5:
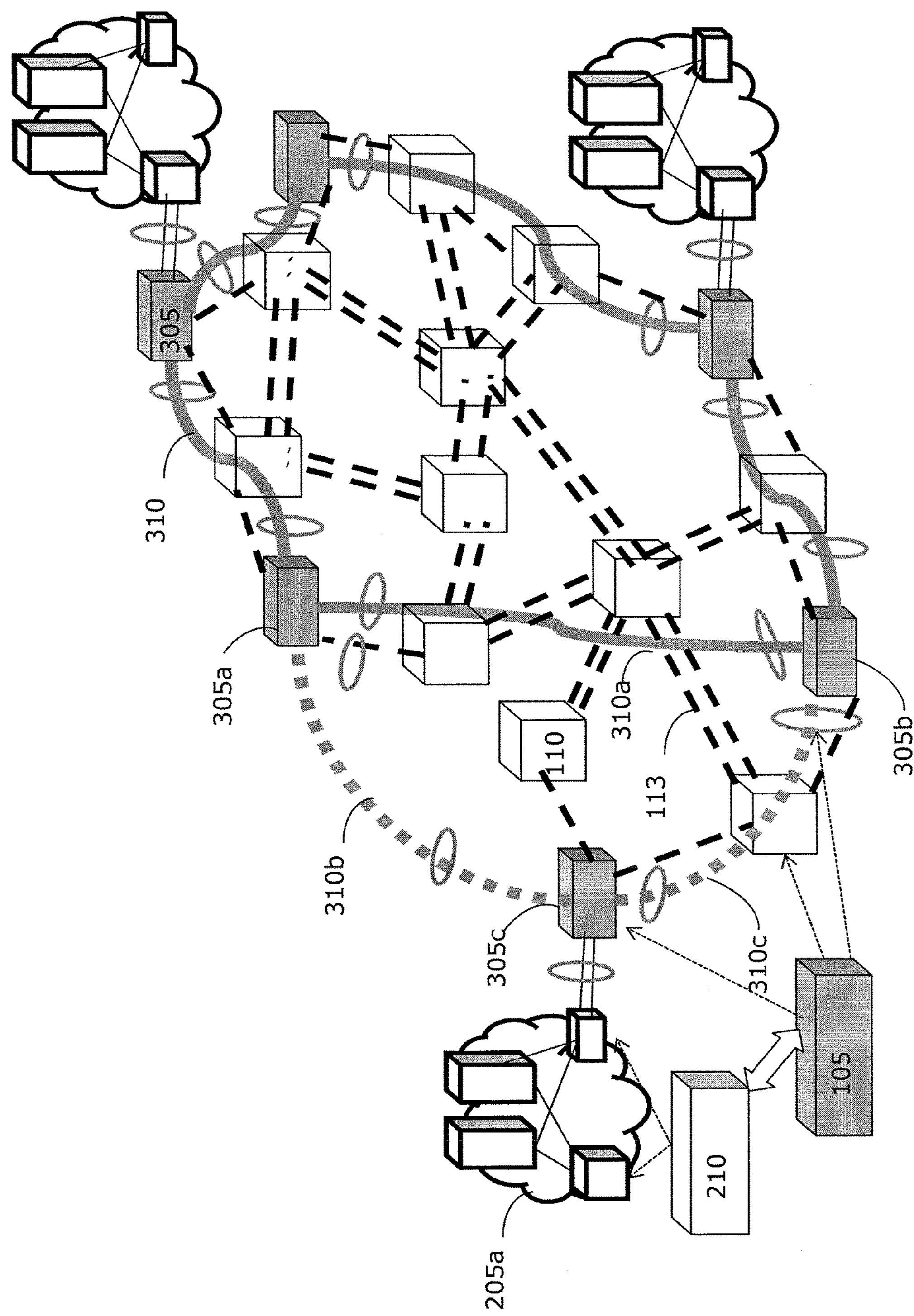
FIG. 5 is a schematic diagram illustrating an example of how a TSDN controller may dynamically add or remove logical members of an example logical ring.

FIG. 5 is a schematic diagram illustrating an example of how the TSDN controller 105 may dynamically add or remove a ring member 305 from the logical ring.

A new ring member 305 may be added in order to enable access to the logical ring by a new site 205*a*, for example. The addition of a new ring member 305 may be triggered by a request from the site controller 210 of the new site 205*a*. This request to join the ring is typically issued to the TSDN controller 105. The TSDN controller 105 may then consider the current ring topology to determine if a current ring member 305 is able to provide access to the new site 205*a*. If the TSDN controller 105 determined that there is no current ring member 305 that is able to provide access to the new site 205*a* (e.g., all current ring members 305 are sufficiently geographically and/or topologically distant from the new site 205*a*), a new ring member 305 may be added. Addition of a new ring member 305 may be carried out by the TSDN controller 105 in a hitless manner (i.e., without affecting traffic flow in the logical ring).

After examining the current ring topology, the TSDN controller 105 may determine where a new ring member 305*c* should be added to the logical ring. In the example shown, the TSDN controller 105 determines that the new ring member 305*c* should be added between existing ring members 305*a* and 305*b*.

The TSDN controller 105 may then add new ring segments 310*b* and 310*c* to the existing logical ring, to connect the new ring member 305*c* to existing ring members 305*a* and 305*b*. The new ring segments 310*b* and 310*c* may be created by aggregating together (e.g., using LAG) appropriate L1/L0 logical connections to the new ring member 305*c*.

After the new ring member 305*c* and the new ring segments 310*b*, 310*c* have been established, the existing ring segment 310*a* between ring members 305*a* and 305*b* may be removed by the TSDN controller 105. Because it is possible to ensure that the ring segment 310*a* is not removed until after the new ring segments 310*b*, 310*c* have been established, traffic flow in the logical ring is not negatively impacted. In addition to ensuring that ring segment 310*a* is not decommissioned until after a suitable replacement route is created, it is also possible to ensure that the connection provided by the ring segment 310*a* remains active while diverting traffic onto the newer ring segments 310*b*, 310*c* before ring segment 310*a* is decommissioned. This allows all traffic that has been placed onto ring segment 310*a* to exit the ring segment 310*a* before the ring segment 310*a* is removed. Traffic management techniques appropriate to logical rings, such as temporary reversal of traffic flow during removal of the old ring segment 310*a*, may be used to ensure traffic flow is not negatively impacted. Using these techniques, the logical ring may be hitlessly expanded by the dynamic addition of the new ring member 305*c* and new site 205*a*. It should be noted that the when the logical layout of a ring is expanded to accommodate a new member (e.g. new segments are added), at least two existing ring members (e.g., ring members 305*a*, 305*b* in the present example) will be provided with updated routing tables. Any affected ring members can be provided with an instruction to keep the old ring segment active until a hitless transition can be provided.

The L2 ring protocol configuration may be updated accordingly at the TSDN controller 105 to reflect the new ring topology.

In a similar manner, hitless dynamic removal of a ring member may also be performed by the TSDN controller 105. For example, if the ring member 305*c* were to be removed from the logical ring (e.g., due to the site 205*a* no longer requiring participation in the logical ring), the TSDN controller 105 may first establish a new ring segment 305*a* between ring members 305*a* and 305*b*, and then remove ring segments 310*b* and 310*c* that connect the ring member 305*c* to the rest of the logical ring. Again, traffic flow in the logical ring does not need to be negatively impacted. The L2 ring protocol configuration may be updated accordingly at the TSDN controller 105 to reflect the new ring topology. In some cases, even if traffic demands indicate that a removal of a ring member 305 is appropriate, the TSDN controller 105 may not immediately remove the ring member 305 and its associated ring segments 310 from the logical ring (e.g., the TSDN controller 105 may implement a hysteresis effect), for example in anticipation of future needs and/or to avoid flip-flopping.

Figure 6:
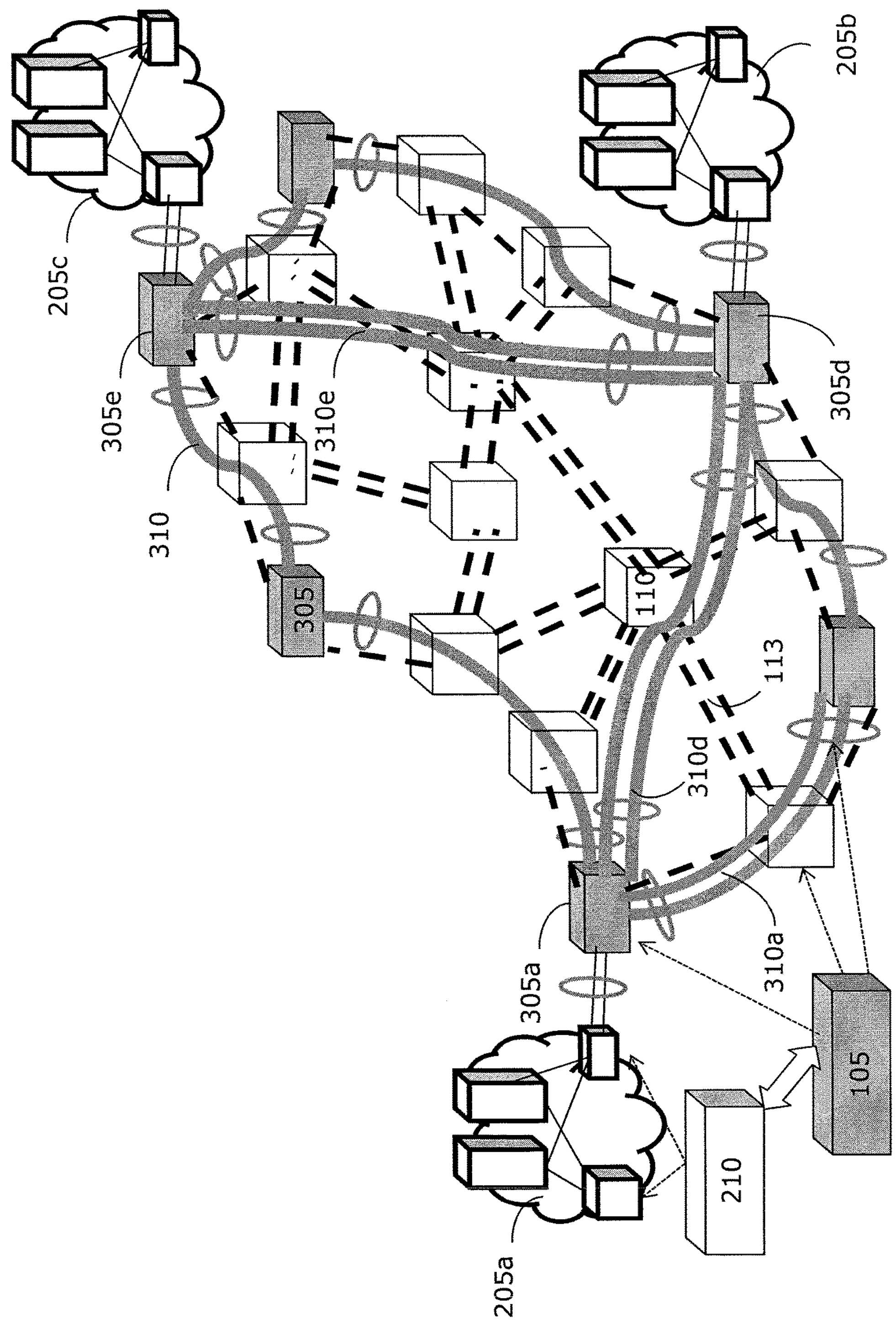
FIG. 6 is a schematic diagram illustrating an example of how a TSDN controller may dynamically create bypass links in an example logical ring.

FIG. 6 is a schematic diagram illustrating an example of how the TSDN controller 105 can dynamically create bypass links in the logical ring. In a standard ring topology, traffic flows around the circumference of the ring. If there are two sites 205 that have a large amount of traffic between them, it may be beneficial to allow for a bypass link that directly connects the two sites 205. For example, it may be desirable to have bypass links in the logical ring between two sites 205, to enable faster direct communication (e.g., for unicast traffic). An example of such a need for a bypass connection may be when a client of two data center sites creates a service at one site that is used by the other site. Such a client may have a defined need for a high bandwidth connection between the sites with a particular latency. Instead of increasing the allocated resources around the ring to suit this client need, a bypass link, or cut-through connection, can be created.

For example, the TSDN controller 105 may determine, based on traffic matrices from sites 205*a* and 205*b*, that there is a requirement for higher capacity between these two sites 205*a*, 205*b*. The sites 205*a* and 205*b* are not connected to each other through adjacent ring members 305. Accordingly, the TSDN controller 105 may establish a direct route for traffic between the two sites 205*a* and 205*b*. This direct route between the adjacent ring members can enable faster communication and avoid congestion on the ring by allowing traffic between the sites to bypass the ring. Alternatively, one or both of the sites 205*a* and 205*b* may transmit a request to the TSDN controller 105 requesting creation of a bypass link directly between the sites 205*a* and 205*b* (or between the associated ring members 305).

The creation of a bypass link may be similar to the creation of a new ring segment, for example as described above, however no new logical ring members are added. In the example shown, the TSDN controller 105 may create a bypass link 310*d* enabling direct traffic between sites 205*a* and 205*b*, by aggregating together L1/L0 connections between non-adjacent ring members 305*a* and 305*d*. The bypass link 310*d* may be provided with greater capacity than other ring segments 310, for example. The TSDN controller 105 may then update the ring protocol accordingly so that unicast traffic may be sent directly via the bypass link 310*d*. Typically, bypass link 310*d* only carries traffic that originates from one of sites 205*a* and 205*b*, and that is directed to the other one of sites 205*a* and 205*b*.

In some examples, the TSDN controller 105 may additionally increase the capacity of an existing ring segment 310*a* between the sites 205*a* and 205*b*, for example depending on the traffic needs of the sites 205*a* and 205*b*. In some examples, if the traffic matrices from the sites 205*a* and 205*b* show a requirement for higher capacity between these two sites 205*a*, 205*b*, the TSDN controller 105 may first attempt to increase the capacity of existing ring segments 310 between the two sites 205*a*, 205*b* before creating a bypass link 310*d*. If the capacity of the ring segments 310 has been increased prior to the creation of bypass link 310*d*, the creation of the bypass link 310*d* may serve as a trigger to reduce the capacity of the remaining ring segments 310.

In some examples, a logical ring may include more than one bypass link. For example, FIG. 6 also shows a second bypass link 310*e* between non-adjacent ring members 305*d* and 305*e*, enabling direct unicast traffic between sites 205*d* and 205*c*.

While unicast traffic may be carried on the bypass links 310*d*, 310*e* between the directly linked sites 205*a* and 205*b*, and 205*b* and 205*c*, respectively, multicast traffic may remain on the logical ring. It should be noted that the sites 205 may remain unaware of the presence of any bypass links 310*d*, 310*e* (e.g., if the site 205 did not itself request creation of a bypass link).

Bypass links may thus be created dynamically by the TSDN controller 105, in response to changing traffic conditions, in a hitless manner. Similarly, bypass links may be dynamically removed by the TSDN controller 105, in response to changing traffic conditions, in a hitless manner.

Figure 7:
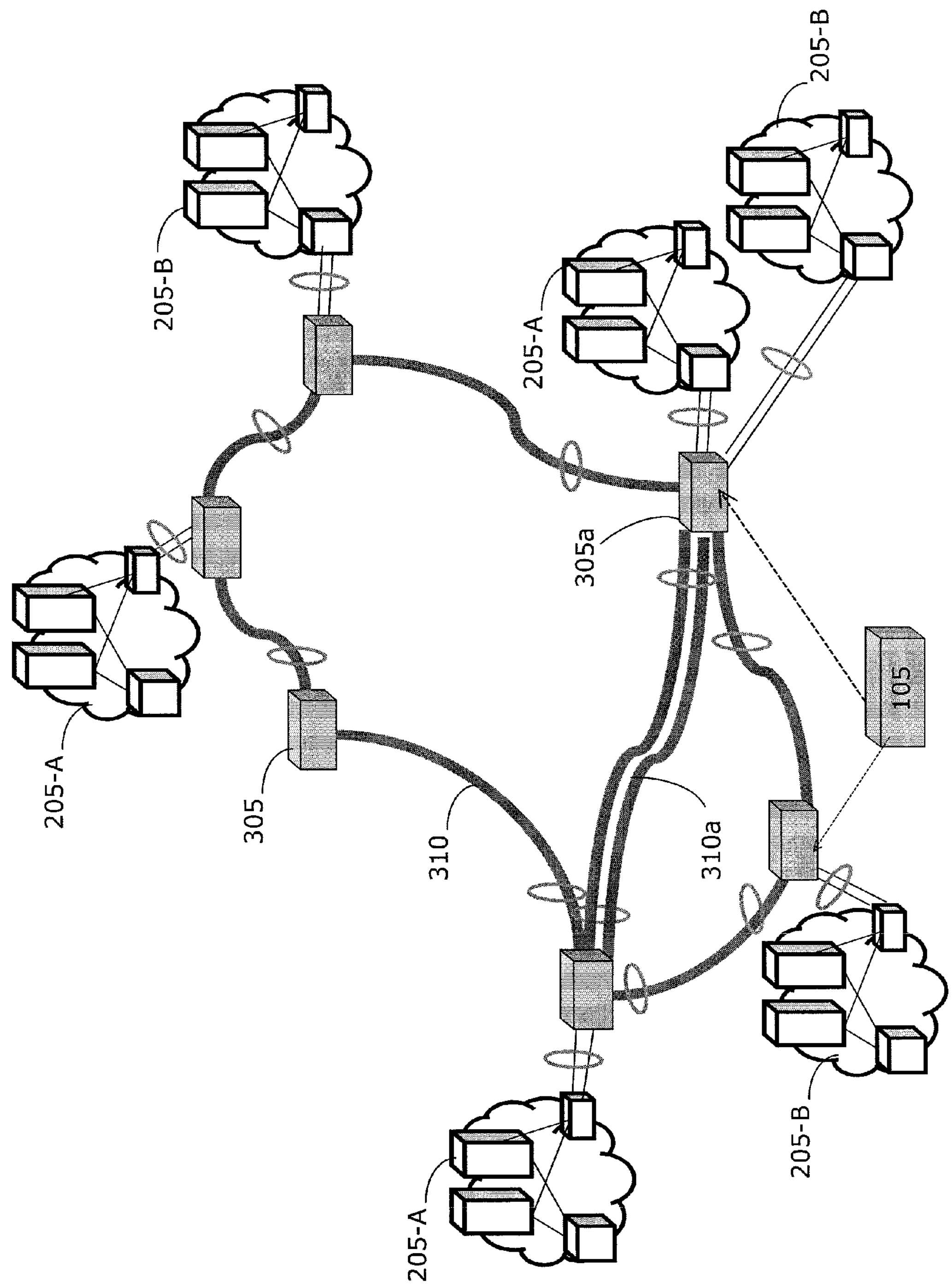
FIG. 7 is a schematic diagram illustrating an example of how a logical ring may serve multiple sets of interconnected sites.

FIG. 7 is a schematic diagram illustrating an example of how a logical ring may serve multiple sets of interconnected sites. For ease of understanding, the switches and physical fiber connections of the physical network are not shown.

In the example shown, a plurality of sites 205-A form one set of sites communicating with each other (e.g., via VPN-A) and a plurality of sites 205-B form a separate set of sites communicating with each other (e.g., via separate VPN-B). The same logical ring, managed by the same TSDN controller 105, may serve both sets of sites 205-A and 205-B. This may be implemented by tagging packets for VPN-A differently from packets for VPN-B (e.g., using stacked virtual local area network (VLAN) tags or equivalently using service instance identifiers (ISID)). In some examples, it may be practical for different sets of sites 205-A, 205-B to share the same logical ring in cases where the traffic patterns of the two sets of sites 205-A, 205-B are complementary, where there is sufficient topological or geographical overlap between the two sets of sites 205-A, 205-B and where the total traffic of both sets of sites 205-A, 205-B is within the capacity of the logical ring.

As shown in the example of FIG. 7, a ring member 305*a* may serve both sites 205-A and 205-B which belong to separate communication sets. The sites 205-A of one communication set may not be aware of the sites 205-B of another communication set sharing the same logical ring. Each set of sites 205-A, 205-B may independently transmit traffic information (e.g., traffic matrices) and/or topology requests (e.g., request to create a bypass link) to the TSDN controller 105. The TSDN controller 105 may accordingly manage traffic on the logical ring and/or dynamically make changes to the ring topology with consideration for the impact on traffic for both sets of sites 205-A, 205-B.

In the example shown, the logical ring includes a bypass link 310*a* (e.g., created by the TSDN controller 105 in response to traffic demands). As illustrated, bypass link 310*a* serves two sites in the set of sites 205-A, but those skilled in the art will appreciate that in other embodiments, bypass links can be shared by both sets of sites 205-A and 205-B where the need and opportunity arise.

In some examples, as traffic conditions change, the traffic pattern of one set of sites 205-A may diverge from the traffic pattern of the other set of sites 205-B. For example, the set of sites 205-A may add new members that are topologically or geographically distant from the set of sites 205-B. In such a case, the TSDN controller 105 may determine that the two sets of sites 205-A and 205-B would be better served by two separate logical rings. The TSDN controller 105 may then create separate logical rings for each set of sites 205-A and 205-B. Traffic management techniques appropriate to management of logical rings may be used to ensure that traffic flow is not negatively impacted. For example, there may be a temporary transition period during creation of two separate logical rings in which traffic from both sets of sites 205-A, 205-B may use both logical rings.

Although only two sets of sites 205-A, 205-B are shown sharing the logical ring, there may be more separate site sets sharing the logical ring, as long as the capacity of the logical ring is able to support the traffic.

Figure 8:
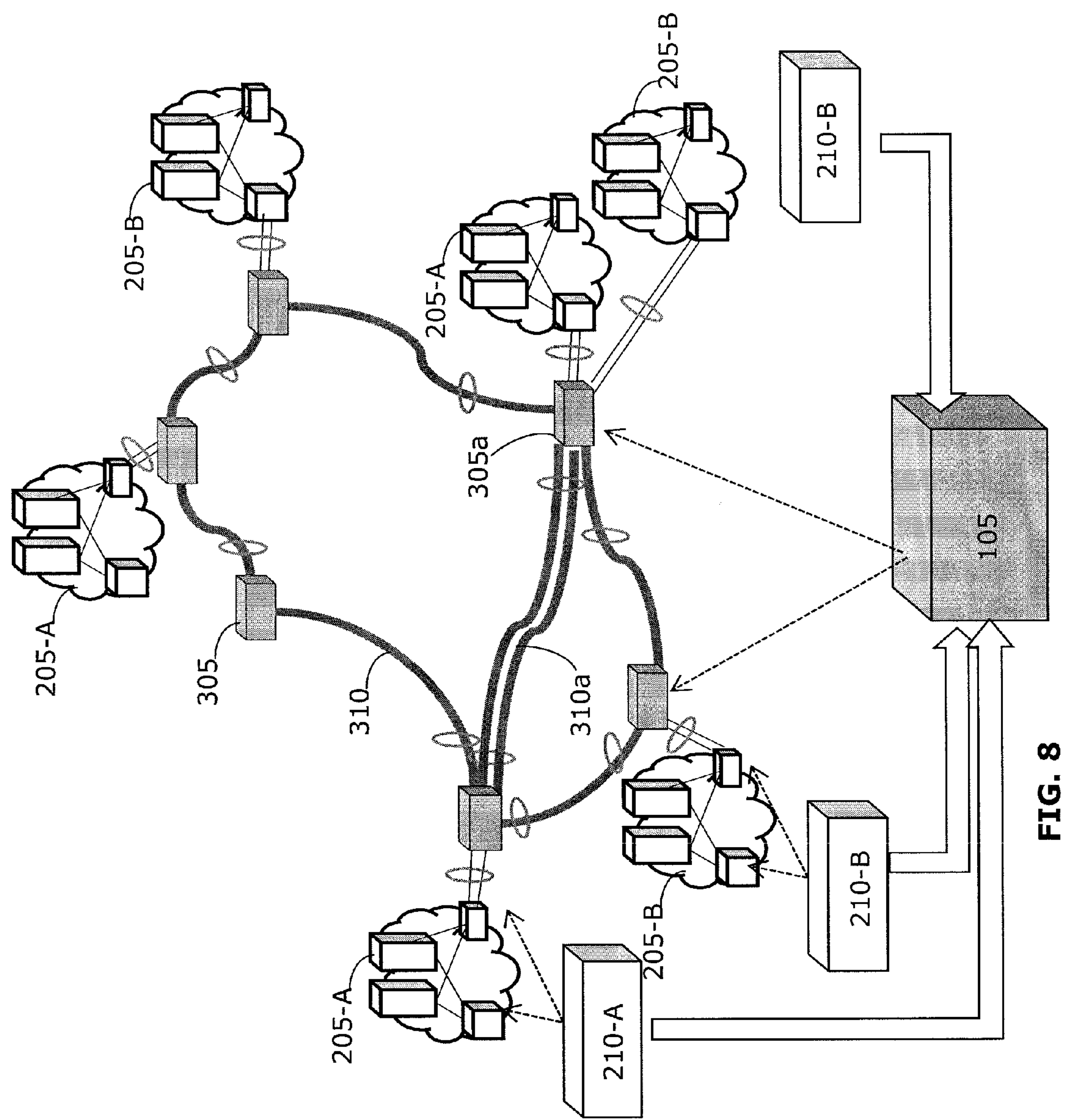
FIG. 8 is a schematic diagram illustrating an example of how a site controller may communicate with a TSDN controller.

FIG. 8 is a schematic diagram illustrating an example of how a site controller 210 may communicate with the TSDN controller 105. For ease of understanding, the switches and physical fiber connections of the physical network are not shown.

In the example shown, the logical ring is serving two sets of sites 205-A and 205-B. The site controllers 210-A and 210-B for each respective set may communicate their respective traffic demands to the TSDN controller 105. The TSDN controller 105 may perform optimization for the traffic of each set of sites 205-A, 205-B separately, or may perform optimization for the global traffic on the logical ring.

The TSDN controller 105 may also be accessed by site controllers 210-A, 210-B via a TSDN application provided by the TSDN controller 105. The TSDN application may provide differing levels of statistical multiplexing between site sets 205-A, 205-B (e.g., ranging from zero multiplexing up to the maximum permitted by the traffic flows). Using the TSDN application, a site 205-A may communicate a request to join the logical ring and may indicate its membership in the set of sites 205-A (e.g., using a secure protocol). In some examples, a site 205-A may be required to provide a key or other authorization information in order to join the set of sites 205-A.

In some examples, the TSDN application may enable storage of keys or key values from site controllers 210-A, 210-B at the TSDN controller 105. This may be a relatively small amount of storage. Storage of key values at the TSDN controller 105 may enable data exchange and/or mutual discovery by site controllers 210-A, 210-B. Such data exchange and/or discovery by site controllers 210-A, 210-B may be limited to within the same set of sites 205-A, 205-B (i.e., site controller 210-A is only able to exchange data and/or discover another site controller 210-A belonging to the same set of sites 205-A).

Although communication between a site controller 210 and the TSDN controller 105 has been described in the context of multiple sets of sites 205-A, 205-B being served on the logical ring, similar communications may be carried out where there is only one set of sites 205 served by the logical ring.

Figure 9:
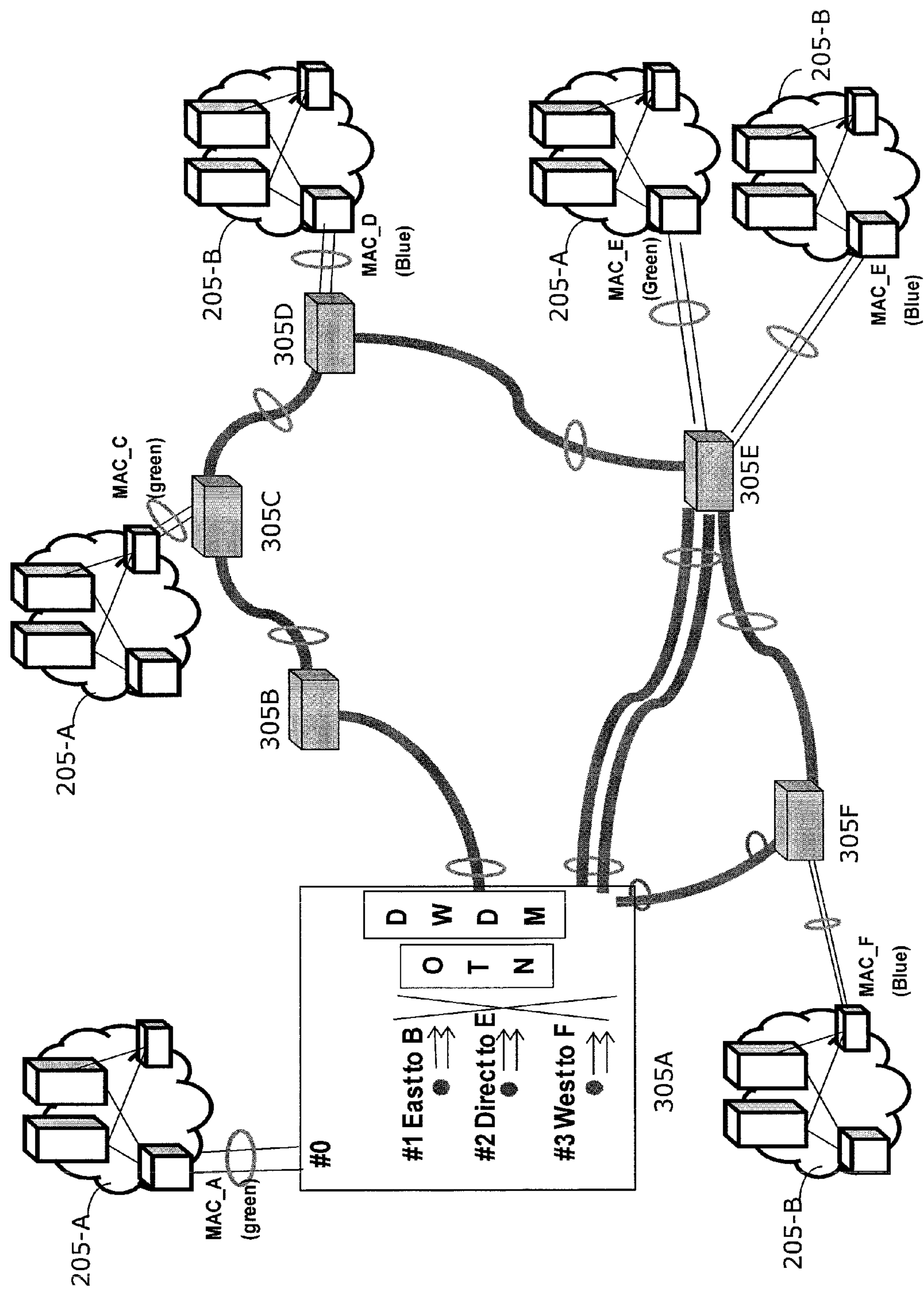
FIG. 9 is a schematic diagram illustrating an example of how packets may be forwarded in an example logical ring.

FIG. 9 is a schematic diagram illustrating an example of how packets may be forwarded in an example logical ring. For ease of understanding, the switches and physical fiber connections of the physical network are not shown.

In this example, a ring member 305A is illustrated with forwarding options in a routing table: #1—east to ring member 305B; #2—direct to ring member 305E (using a bypass link); and #3—west to ring member 305F. The ring member 305A forwards packets according to one of these options, using OTN and DWDM, for example. The ring member 305A is also able to pull off the ring any packets addressed to its connected site 205A; this may be considered forwarding option #0.

It should be noted that the routing table for each ring member 305 may be updated, for example when instructed by the TSDN controller 105, to reflect changes in the ring topology (e.g., addition/removal of a ring member or addition/removal of a bypass link).

A packet on the ring may be labeled with its destination address, or may be labeled as a broadcast packet. If there are multiple sets of sites sharing the same logical ring, packets may also be labeled with which set the packet belongs to. When the ring member 305A receives a packet, the ring member 305A forwards the packet according to a routing process associated with its label. In the example shown, packets on the ring may be labeled with the media access control (MAC) address of its destination site and/or its destination ring member, or may be labeled as a broadcast packet. Packets may also be labeled as belonging to the Green set of sites or the Blue set of sites. When the ring member 305A receives a packet, the ring member 305A may process the packet, for example parsing the packet label in order to determine which forwarding option to apply to the packet.

The ring member 305 may be programmed (e.g., with appropriate L2 behavior) to route traffic to ring segments or to bypass links, for example, based on whether the MAC header indicates a broadcast packet, or a MAC address. In some examples, the routing decision may also be based on the presence of any Quality of Service (QOS) bits in the packet header (which may indicate that the packet is high priority and thus should be routed through bypass links where available) or any other suitable header mapping information. The packets may be routed according to any suitable packet routing techniques. The following table illustrates some examples.

| Packet label | Parsed address | Parsed set identifier | Forwarding option |
|---|---|---|---|
| MAC_A/Green | MAC_A | Green | #0 (pull off ring) |
| MAC_C/Green | MAC_C | Green | #1 (East) |
| MAC_E/Blue | MAC_E | Blue | #2 (Bypass) |
| MAC_E/Green | MAC_E | Green | #2 (Bypass) |
| MAC_F/Blue | MAC_F | Blue | #3 (West) |
| BCAST/Blue | Broadcast | Blue | #1 (East) |
| BCAST/Green | Broadcast | Green | #3 (West) |

As discussed previously, where there are multiple sets of sites served by the same ring members on the same logical ring, stacked VLAN tags or ISIDs may be used to differentiate between packets belonging to different site sets.

Figure 10:
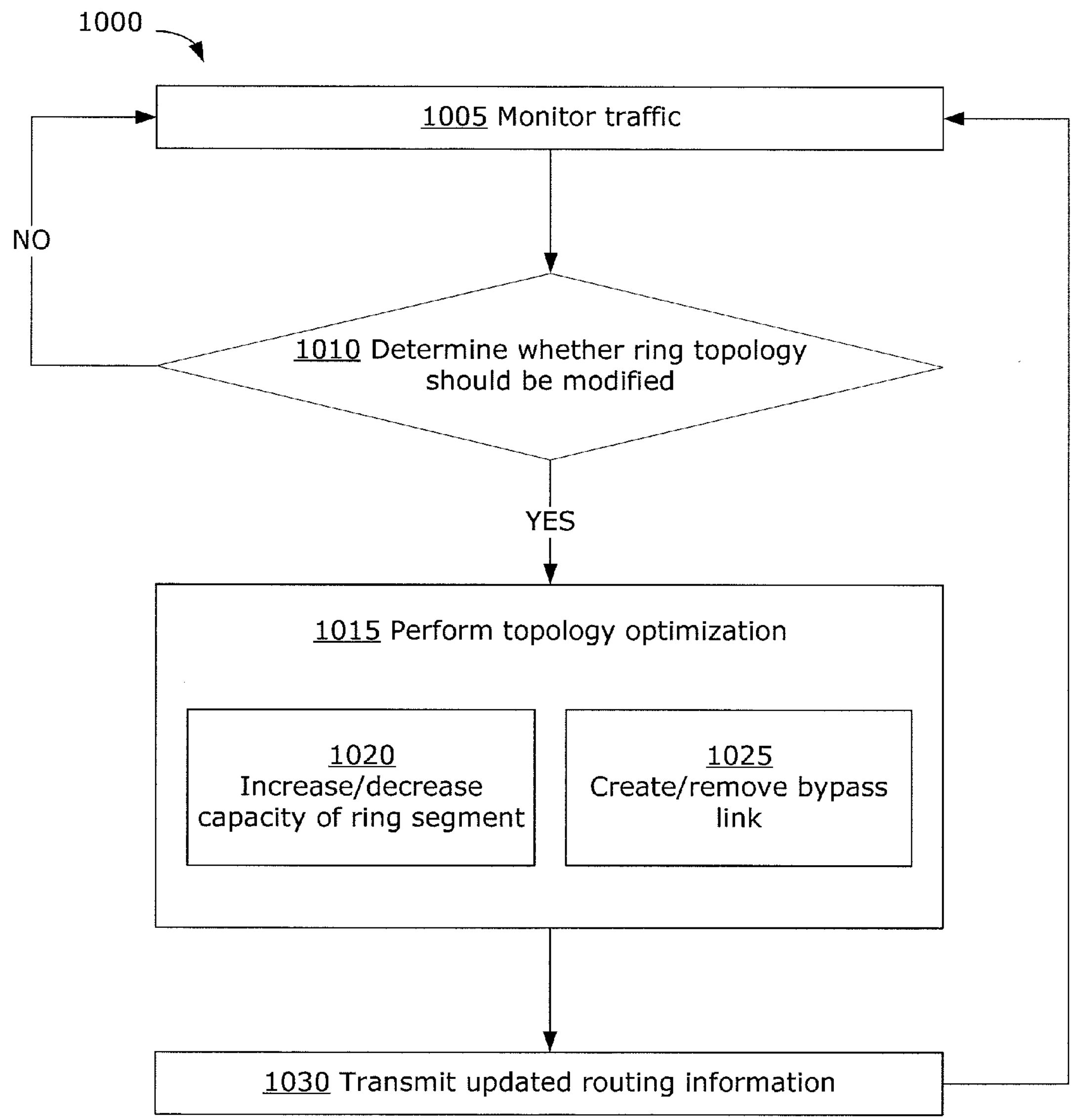
FIG. 10 is a flowchart illustrating an example of how a TSDN controller may dynamically modify the topology of an example logical ring.

FIG. 10 is a flowchart illustrating an example method 1000, which may be performed by the TSDN controller 105, for dynamically modifying the ring topology.

At 1005, the TSDN controller 105 may monitor the traffic in the ring. This may include, for example, receiving traffic demands from one or more site controllers 210 associated with sites 205 connected to the ring. The TSDN controller 105 may monitor the traffic in other ways as well, for example using various suitable TSDN or SDN monitoring techniques.

At 1010, the TSDN controller 105 may determine, based on the traffic information, whether the ring topology should be modified. Determination of whether ring topology should be modified may be based on whether a change (e.g., increase or decrease) in traffic in one or more ring segments 310 exceeds a predefined threshold, for example. If it is determined that the ring topology does not need to be modified, the method 1000 may return to 1005 to continue monitoring traffic. If it is determined that the ring topology does need to be modified, the method 1000 may continue to 1015.

At 1015, the TSDN controller 105 may perform topology optimization (e.g., using appropriate TSDN or SDN techniques) to accommodate the change in traffic. Topology optimization may include, at 1020, increasing/decreasing the capacity of one or more ring segments 310 (e.g., as described with reference to FIG. 4 above) and/or, at 1025, creating/removing one or more bypass links (e.g., as described with reference to FIG. 6 above).

At 1030, after the topology has been suitably modified, the TSDN controller 105 may update its own stored information about the ring configuration to reflect the new ring topology. The TSDN controller 105 may transmit updated routing information to one or more ring members 305, reflecting the change in ring topology. In some examples, the TSDN controller 105 may transmit the updated routing information onto to those ring members 305 that are directly affected by the change in ring topology.

The method 1000 may loop back to 1005 to continue monitoring traffic on the ring.

Other triggers may cause the TSDN controller 105 to modify the ring topology. For example, a site controller 210 may transmit a request to the TSDN controller 105 requesting the creation of a bypass link. The ring topology may also be modified by the addition or removal of a ring member 305.

Figure 11:
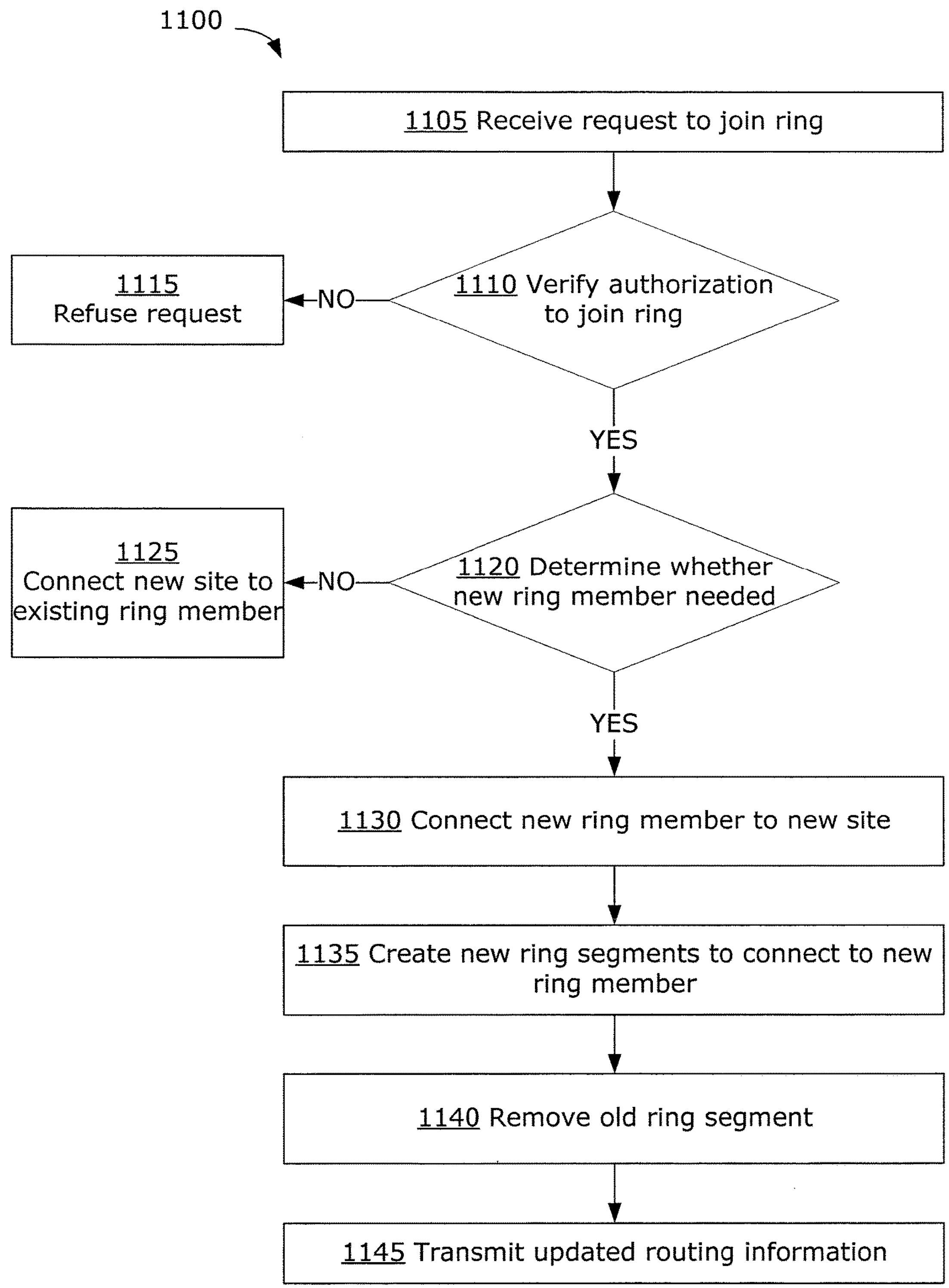
FIG. 11 is a flowchart illustrating an example of how a TSDN controller may dynamically add a new ring member to an example logical ring.

FIG. 11 is a flowchart illustrating an example method 1100, which may be performed by the TSDN controller 105, for adding a new site 205 to the logical ring.

At 1105, the TSDN controller 105 may receive a request from a new site 205 to join the logical ring. The request may include authorization information, such as a key or shared secret required to join a set of sites.

At 1110, the TSDN controller 105 may verify whether the new site 205 is authorized to join the ring. This may include verifying that the new site 205 has the correct key or shared secret required to join the set of sites.

If the verification fails, then at 1115 the TSDN controller 105 may refuse the request and the method 1100 may end.

If the verification is successful, then at 1120 the TSDN controller 105 may determine whether a new ring member 305 needs to be added to connect to the new site 205.

If no new ring member 305 is required, then at 1125 the TSDN controller 105 may establish a connection between the new site 205 and an existing ring member 305 (e.g., a ring member 305 closest to the new site 205). The method 1100 may end.

If a new ring member 305 is required, then at 1130 the TSDN controller 105 may connect a new ring member 305 to the new site 205. The new ring member 305 may be selected to be one that is closest to the new site 205.

At 1135 and 1140, the TSDN controller 105 may create new ring segments 310 to join the new ring member 305 to existing ring members 305, and subsequently remove a redundant old ring segment 310, for example as described with reference to FIG. 5. In some examples, the TSDN controller 105 may connect the new ring member 305 to the new site 205 after creating new ring segments (i.e., 1135 and 1140 may be carried out before 1130).

At 1145, the ISDN controller 105 may update its own stored information about the ring configuration to reflect the new ring topology. The TSDN controller 105 may transmit updated routing information to one or more ring members 305, reflecting the change in ring topology. In some examples, the TSDN controller 105 may transmit the updated routing information onto to those ring members 305 that are directly affected by the change in ring topology.

The present disclosure thus enables the creation of a L2VPN for interconnecting multiple sites (e.g., data centers), using a L2 logical ring. L1/L0 switches may be ring members, and they may be connected together as a logical ring via ring segments, which may be L1/L0 LAG links. The ring may be monitored and managed by a TSDN controller.

The TSDN controller may dynamically and hitlessly increase or decrease capacity of individual ring segments by adding or removing L1/L0 connections to the ring segment LAG links, for example in response to changing traffic conditions. The TSDN controller may dynamically add or remove ring members in a hitless manner, for example in response to changing traffic conditions and/or to add or remove site connections. The TSDN controller may also dynamically and hitlessly add or remove bypass links that enable direct unicast traffic between non-adjacent ring members.

A site controller may, via an application provided by the TSDN controller, affect the behavior of the TSDN controller (e.g., where the site controller has sufficient authorization to do so). For example, the site controller may, via the TSDN application, monitor traffic on the logical ring and may cause the TSDN to add or remove bypass links accordingly. In some examples, the TSDN application may first verify that the site controller has secure membership in the logical ring and may further verify that the site controller has sufficient authority to run a TSDN application.

Although certain examples have been discussed, it should be understood that these are intended to be exemplary and not limiting. For example, any L2 technology may (with or without modification) be run on top of the L2 logical ring. Any traffic monitoring and managing techniques used for TSDN and SDN may also be used.

The present disclosure provides, in various examples, a technique for enabling site interconnections that appear, from the viewpoint of a site, to be connections to a central logical L2 switch. Examples of the present disclosure may enable such a central switch to be emulated, while also enabling dynamic capacity changes by a TSDN controller, which may be completely transparent to the interconnected sites.

The present disclosure may be applicable to standards such as TSDN, SDN, Generalized Multiprotocol Label Switching (GMPLS) and Automatically Switched Optical Network (ASON), for example. Any interconnected sites that interconnect via L2 over a transport network may make use of the present disclosure.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of managing traffic among a plurality of interconnected sites, the sites being interconnected via ring members and ring segments of a logical ring implemented by a network controller over a physical transport network, the method comprising:

receiving information about traffic in the logical ring;

adjusting capacity of the ring, in accordance with the received information, by creating a direct bypass link between two non-adjacent ring members; and transmitting updated routing information to one or more ring members, the updated routing information indicating that only unicast traffic between the two non-adjacent ring members is to be carried on the bypass link.

2. The method of claim 1, wherein the updated routing information reflects a change in ring topology including at least one of: creation of a new traffic path or removal of an existing traffic path.

3. The method of claim 1, further comprising outputting a graphical representation of the logical ring to a graphical user interface.

4. The method of claim 1, wherein receiving information comprises receiving indication of site-to-site traffic demands from one or more sites connected via the logical ring.

5. The method of claim 1, further comprising:

receiving a request from a new site to join the logical ring;

creating new ring segments to connect existing ring members of the logical ring to a new ring member;

connecting the new ring member to the new site, to connect the new site to the logical ring;

removing any redundant ring segments; and updating a ring configuration protocol to reflect the new ring segments and the new ring member.

6. The method of claim 5, further comprising:

prior to connecting the new site to the logical ring, verifying whether the new site has sufficient authorization to join the logical ring.

7. The method of claim 1, wherein there are at least two distinct defined sets of sites interconnected via the logical ring, and wherein topology management is performed separately for each set of sites.

8. The method of claim 1, wherein there are at least two distinct defined sets of sites interconnected via the logical ring, and wherein topology management is performed globally for all sets of sites.

9. The method of claim 1 wherein adjusting capacity of the ring further comprises at least one of:

prior to creating the bypass link, attempting to increase capacity of one or more ring segments between the two non-adjacent sites; or after creating the bypass link, reducing the capacity of one or more ring segments between the two non-adjacent sites.

10. A system for managing traffic among a plurality of interconnected sites, the system comprising:

a transport software-defined networking (TSDN) controller configured to manage traffic over a transport network including the sites, the TSDN controller comprising a processor configured to execute instructions to cause the TSDN controller to:

implement a logical ring over physical components of the transport network, the logical ring including ring members and ring segments, the sites being logically interconnected via the logical ring;

receive information about traffic in the logical ring;

adjust capacity of the ring, in accordance with the received information, by creating a direct bypass link between two non-adjacent ring members; and transmit updated routing information to one or more ring members, the updated routing information indicating that only unicast traffic between the two non-adjacent ring members is to be carried on the bypass link.

11. The system of claim 10, wherein the updated routing information reflects a change in ring topology including at least one of: creation of a new traffic path or removal of an existing traffic path.

12. The system of claim 10, wherein the processor is further configured to execute instructions to further cause the TSDN controller to: output a graphical representation of the logical ring to a graphical user interface.

13. The system of claim 10, wherein the processor is further configured to execute instructions to further cause the TSDN controller to receive information by receiving indication of site-to-site traffic demands from one or more sites connected via the logical ring.

14. The system of claim 10, wherein the processor is further configured to execute instructions to further cause the TSDN controller to:

receive a request from a new site to join the logical ring;

create new ring segments to connect existing ring members of the logical ring to a new ring member;

connect the new ring member to the new site, to connect the new site to the logical ring;

remove any redundant ring segments; and update a ring configuration protocol to reflect the new ring segments and the new ring member.

15. The system of claim 14, wherein the processor is further configured to execute instructions to further cause the TSDN controller to:

prior to connecting the new site to the logical ring, verify whether the new site has sufficient authorization to join the logical ring.

16. The system of claim 10, wherein there are at least two distinct defined sets of sites interconnected via the logical ring, and wherein topology management is performed separately for each set of sites.

17. The system of claim 10, wherein there are at least two distinct defined sets of sites interconnected via the logical ring, and wherein topology management is performed globally for all sets of sites.

18. The system of claim 10 wherein the processor is further configured to execute instructions to cause the TSDN controller to adjust capacity of the ring by:

prior to creating the bypass link, attempting to increase capacity of one or more ring segments between the two non-adjacent sites; or after creating the bypass link, reducing the capacity of one or more ring segments between the two non-adjacent sites.

19. A network comprising:

a plurality of sites;

a plurality of optical switches interconnecting the plurality of sites via physical links; and a transport software-defined networking (TSDN) controller managing the plurality of optical switches;

the TSDN controller being configured to implement a logical ring over the optical switches and the physical links, the logical ring including ring members and ring segments not necessarily coincident with the optical switches and the physical links, the sites being logically interconnected via the logical ring;

wherein the TSDN controller is configured to manage traffic in the logical ring by:

adjusting capacity of the ring by creating a direct bypass link between two non-adjacent ring members; and transmitting updated routing information to one or more ring members, the updated routing information indicating that only unicast traffic between the two non-adjacent ring members is to be carried on the bypass link.

* * * * *